US012803832B2

(12) United States Patent
Chau et al.

(10) Patent No.: US 12,803,832 B2
(45) **Date of Patent: *Nov. 17, 2026**

(54) MERGING A CALL WITH A VIDEO-ENABLED VIRTUAL MEETING

(71) Applicant: Zoom Communications, Inc., San Jose, CA (US)

(72) Inventors: Vi Dinh Chau, Seattle, WA (US); Haibing Xu, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 18/785,749

(22) Filed: Jul. 26, 2024

(65) Prior Publication Data

US 2024/0388461 A1 Nov. 21, 2024

Related U.S. Application Data

(63) Continuation of application No. 17/162,879, filed on Jan. 29, 2021, now Pat. No. 12,074,721.

(51) Int. Cl.
*H04L 12/18* (2006.01)
*G06F 21/31* (2013.01)

(52) U.S. Cl.
CPC .......... *H04L 12/1822* (2013.01); *G06F 21/31* (2013.01); *H04L 12/1818* (2013.01)

(58) Field of Classification Search
CPC ............. H04L 12/1822; H04L 12/1818; G06F 21/31
See application file for complete search history.

(56) References Cited

U.S. PATENT DOCUMENTS 5,483,587 A * 1/1996 Hogan .................... H04M 3/56 379/202.01
7,830,824 B2 11/2010 Decker et al.
8,339,997 B2 12/2012 Dye et al.
8,483,375 B2 7/2013 Dhara et al.
9,325,749 B2 4/2016 Bangor et al.
(Continued)

OTHER PUBLICATIONS

International Search Report and Written Opinion mailed in corresponding PCT Application No. PCT/US2022/014294, mailed Apr. 19, 2022.

(Continued)

*Primary Examiner* — Nazia Naoreen
(74) *Attorney, Agent, or Firm* — Young Basile Hanlon & MacFarlane, P.C.

(57) ABSTRACT

A call is merged with a virtual meeting to allow an audio-only caller to join the virtual meeting while bypassing one or more security checks configured for the virtual meeting. After the virtual meeting is initiated, a call is established between a phone device of the audio-only caller and a customer endpoint. A request is received from the customer endpoint to join the phone device with a virtual meeting. A channel is opened between the phone device and a web service associated with the virtual meeting. The phone device is then joined to the virtual meeting over the channel. To facilitate a seamless transition from the call to the virtual meeting, the call may be maintained as an audio channel of the virtual meeting for the audio-only caller.

20 Claims, 8 Drawing Sheets

(56) References Cited

U.S. PATENT DOCUMENTS

| | | | | |
|---|---|---|---|---|
| 9,521,262 | B2 | 12/2016 | Wang et al. | |
| 9,742,830 | B2 | 8/2017 | Thapa | |
| 10,630,843 | B1 | 4/2020 | Rosenberg | |
| 11,140,203 | B1 * | 10/2021 | Butterfield | H04L 65/403 |
| 2009/0083183 | A1 * | 3/2009 | Rao | G06Q 10/10 705/50 |
| 2009/0179983 | A1 * | 7/2009 | Schindler | H04L 12/1818 348/E7.083 |
| 2010/0238842 | A1 | 9/2010 | Narayanan et al. | |
| 2012/0304078 | A1 * | 11/2012 | Ramaswamy | H04M 3/382 715/753 |
| 2013/0018950 | A1 * | 1/2013 | Narayanan | H04L 12/1818 709/204 |
| 2014/0025740 | A1 * | 1/2014 | Jaudon | H04L 65/401 709/204 |
| 2020/0177647 | A1 | 6/2020 | Ravichandran | |
| 2020/0304547 | A1 | 9/2020 | Lu et al. | |

OTHER PUBLICATIONS

International Search Report and Written Opinion mailed on Sep. 25, 2023 in corresponding PCT Application No. PCT/US2022/014294.

* cited by examiner

MERGING A CALL WITH A VIDEO-ENABLED VIRTUAL MEETING

CROSS-REFERENCE TO RELATED APPLICATION(S)

This application is a continuation of U.S. patent application Ser. No. 17/162,879, filed Jan. 29, 2021, the entire disclosure of which is hereby incorporated by reference.

BACKGROUND

Virtual meetings help people all around the world to connect with one another every day in a variety of business and personal settings. A virtual meeting may be video-enabled to allow participants to see each other in real-time and may also accommodate participants interacting with others through audio alone. Virtual meeting platforms use network connections with participant devices to facilitate audio and/or video communications between participants. The growing ubiquity of network-connected devices enables more and more people to communicate over virtual meetings every day.

SUMMARY

Disclosed herein are, inter alia, implementations of systems and techniques for merging a call with a virtual meeting.

One aspect of this disclosure is a method, which includes establishing a call between a phone device of an audio-only caller and a customer endpoint. A request is received from the customer endpoint to join the phone device with a virtual meeting. A channel is opened between the phone device and a web service associated with the virtual meeting. The phone device is then joined to the virtual meeting over the channel.

Another aspect of this disclosure is a system, which includes a first server and a second server. The first server facilitates a call between a phone device of an audio-only caller and a customer endpoint. The second server runs software to receive a request from the customer endpoint to join the phone device with a virtual meeting, open a channel between the phone device and a web service associated with the virtual meeting, and join the phone device to the virtual meeting over the channel.

Yet another aspect of this disclosure is a server device, which includes a memory and a processor. The processor is configured to execute instructions stored in the memory. The instructions include instructions to initialize a virtual meeting between two or more participants, and, responsive to a request from a customer endpoint to join a phone device of an audio-only caller connected on a call with the virtual meeting, join the phone device to the virtual meeting over a channel opened between the phone device and a web service associated with the virtual meeting, in which the joining of the phone device bypasses one or more security checks configured for the virtual meeting.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

A virtual meeting platform may provide many different ways for its users to connect to one another. For example, users can use a virtual meeting to connect over video, or they can connect over an audio-only call, for example, using telephony services. Sometimes, a caller may contact a user of the virtual meeting platform over a phone call and ask or be asked to join a virtual meeting with that user and/or another user of the virtual meeting platform. However, it is generally not easy for a caller connecting over a telephony service to join a virtual meeting even if the caller has a client application used for the virtual meeting service installed on their phone. This may, for example be because the caller in such a case still needs to switch from a telephone application to the client application and thereafter enter a meeting number to join the virtual meeting. One solution may involve the virtual meeting service switching the caller from telephony audio to voice over IP (VOIP) audio; however, that switching may take some amount of time to complete, during which the caller misses a portion of the conversation. That solution thus does not improve the user experience.

Implementations of this disclosure address problems such as these by merging a call with a virtual meeting to allow an audio-only caller to join the virtual meeting while bypassing one or more security checks configured for the virtual meeting. After the virtual meeting is initiated, a call is established between a phone device of the audio-only caller and a customer endpoint. A request is received from the customer endpoint to join the phone device with a virtual meeting. A channel is opened between the phone device and a web service associated with the virtual meeting. The phone device is then joined to the virtual meeting over the channel. To facilitate a seamless transition from the call to the virtual meeting, the call may be maintained as an audio channel of the virtual meeting for the audio-only caller. In some cases, the virtual meeting is already in-progress when the request is received from the customer endpoint. In some cases, the virtual meeting is initiated responsive to that request.

Figure 1:
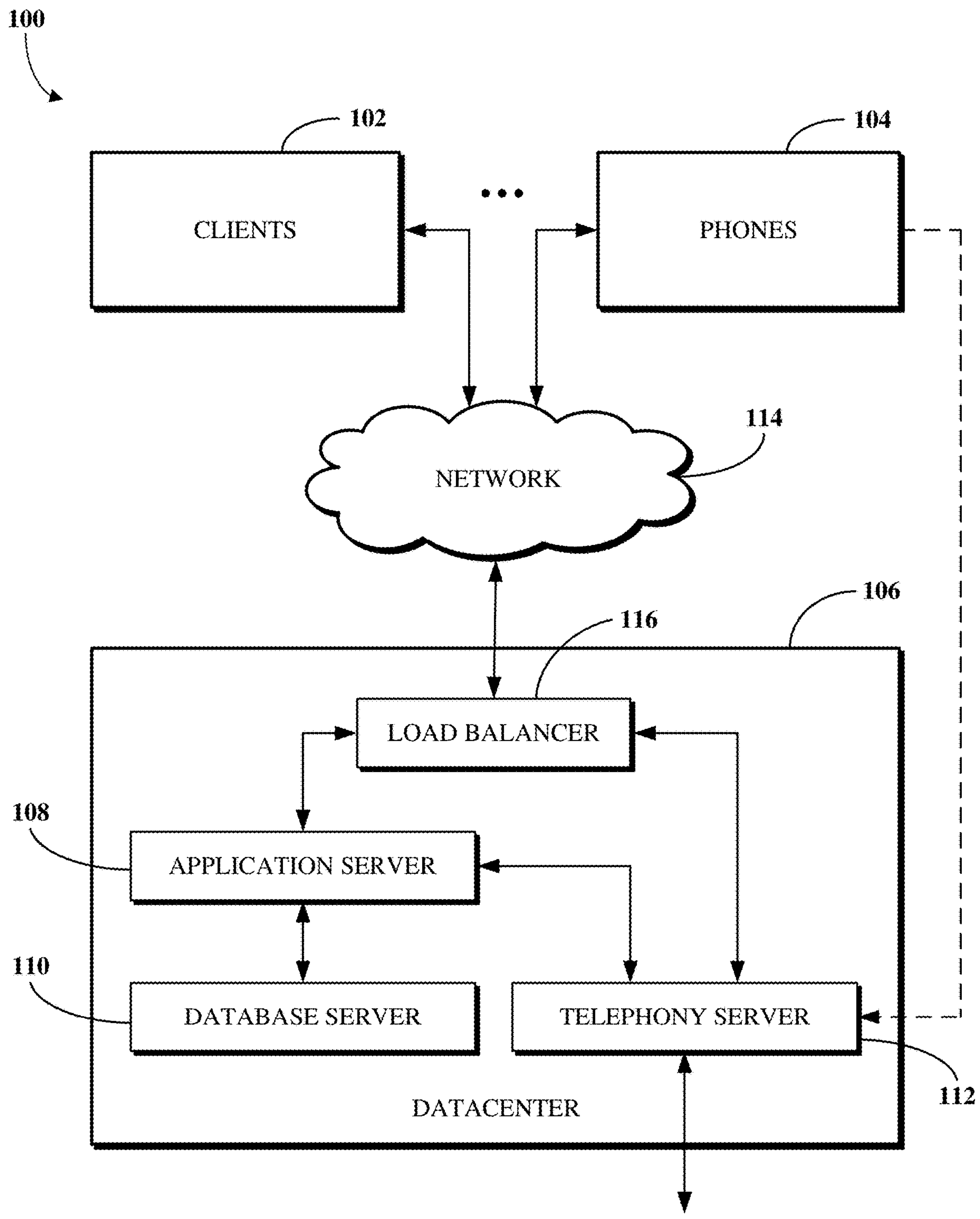
FIG. 1 is a block diagram of an example of an electronic computing and communications system.

To describe some implementations in greater detail, reference is first made to examples of hardware and software structures used to merge a call with a virtual meeting. FIG. 1 is a block diagram of an example of an electronic computing and communications system 100, which can be or include a distributed computing system (e.g., a client-server computing system), a cloud computing system, a clustered computing system, or the like. The system 100 connects various clients 102 and/or phones 104 to services implemented within or otherwise using a datacenter 106. The system 100 can connect a number of clients 102 and/or phones 104 or can have a configuration of clients or phones different from that generally illustrated in FIG. 1. For example, and without limitation, the system 100 can connect hundreds or thousands of clients and/or phones.

A client 102 may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a device. In some implementations, a client can be implemented as a single physical unit or as a combination of physical units. In some implementations, a single physical unit can include multiple clients.

A phone 104 may be or otherwise refer to one or both of a phone device or a phone application such as a softphone. For example, a phone 104 may be a smart phone or other cell phone which may or may not be configured to run mobile applications, such as a client 102. In another example, a phone 104 may be a desk phone, such as a desktop unit configured to at least send and receive calls and includes an input device for receiving a telephone number or extension to dial to and an output device for outputting audio and/or video for a call in progress. In yet another example, the phone 104 may be a softphone representing telephony functionality of a client 102. A phone 104 may or may not be voice over IP (VOIP)-enabled.

The datacenter 106 includes one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers.

The datacenter 106 includes servers used for implementing software services. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106.

In some implementations, one or more of the servers 108 112 can be a non-hardware aspect implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to the clients 102 and at least partially to the phones 104. The software services may be or include virtual meeting software which enables audio, video, and/or other forms of virtual meetings between multiple devices (e.g., between ones of the clients 102, between ones of the phones 104, or between ones of the clients 102 and ones of the phones 104), such as to facilitate a conference between the users of those devices. The virtual meeting software can include functionality for hosting, presenting scheduling, joining, or otherwise participating in a virtual meeting. The virtual meeting software may further include functionality for recording some or all of a virtual meeting and/or documenting a transcript for the virtual meeting. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client 102 as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client 102. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to ones of the clients 102 and ones of the phones 104 which are VOIP-enabled devices configured to send and receive calls over a network, for example, a network 114. In particular, the telephony server 112 includes a session initiation protocol (SIP) zone and a web zone. The SIP zone enables a client 102 or a VOIP-enabled phone 104, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client 102 or VOIP-enabled phone 104 and directs same to a destination device. The SIP zone may include one or more call switches for routing the telephony traffic. For example, to route a VOIP call from a first VOIP-enabled client to a second VOIP-enabled client within the same domain or network, the telephony server 112 may initiate a SIP transaction between a first client and the second client using a PBX. However, in another example, to route a VOIP call from a VOIP-enabled client to a client or phone which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between ones of the clients 102 and/or between ones of the phones 104. When incoming telephony traffic for delivery to a client 102 or a phone 104 originating from outside the telephony server 112 is received, a SBC receives the traffic and forwards it to a call switch for routing to the client 102 or the phone 104.

The web zone receives telephony traffic from a client 102 or a phone 104, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 102 and the phones 104 communicate with aspects of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof. In some implementations in which one or more of the phones 104 is not a VOIP-enabled device, those one or more phones 104 may communicate other than via the network 114.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 102, by the application server 108, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
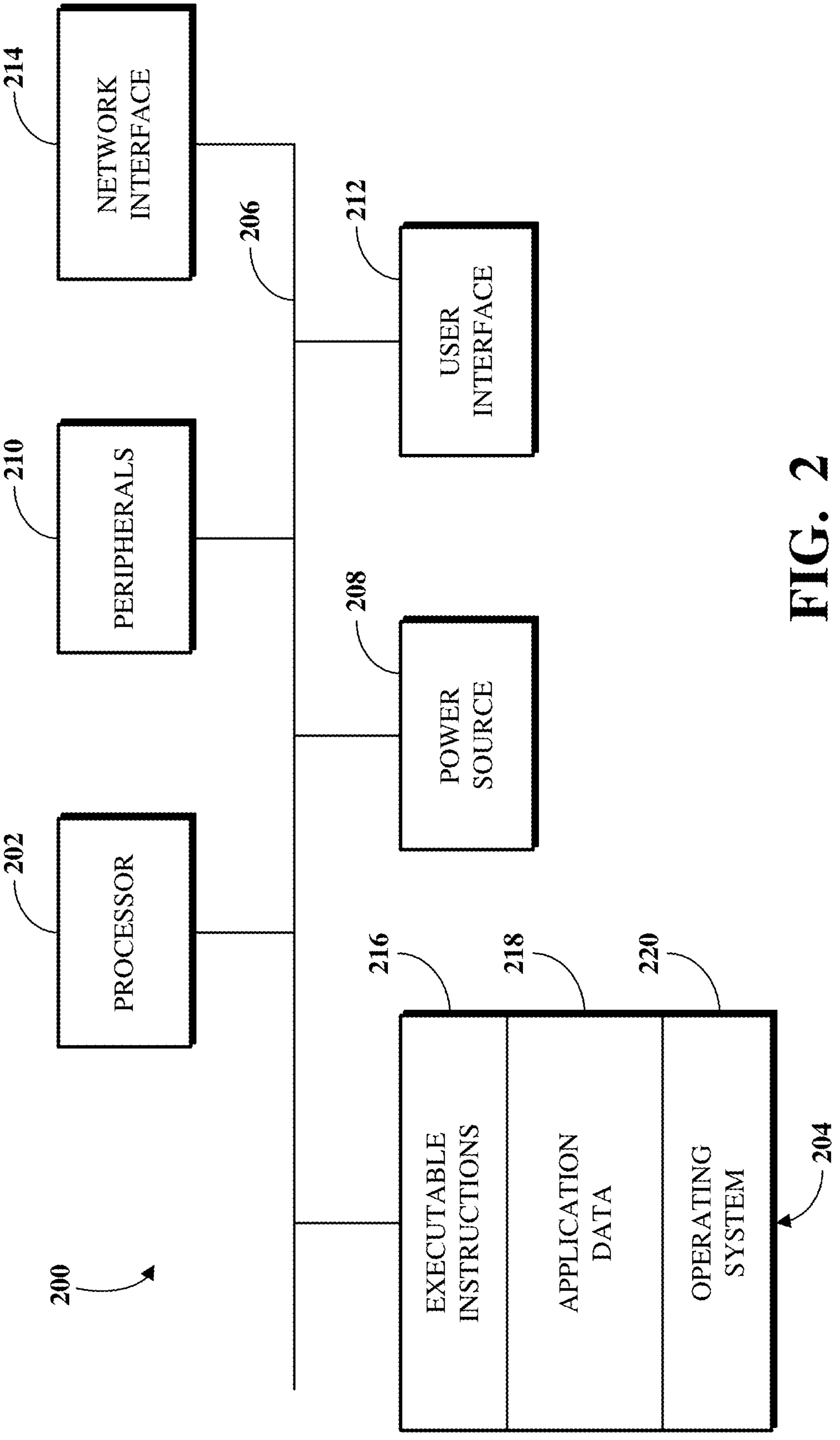
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the gateway 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
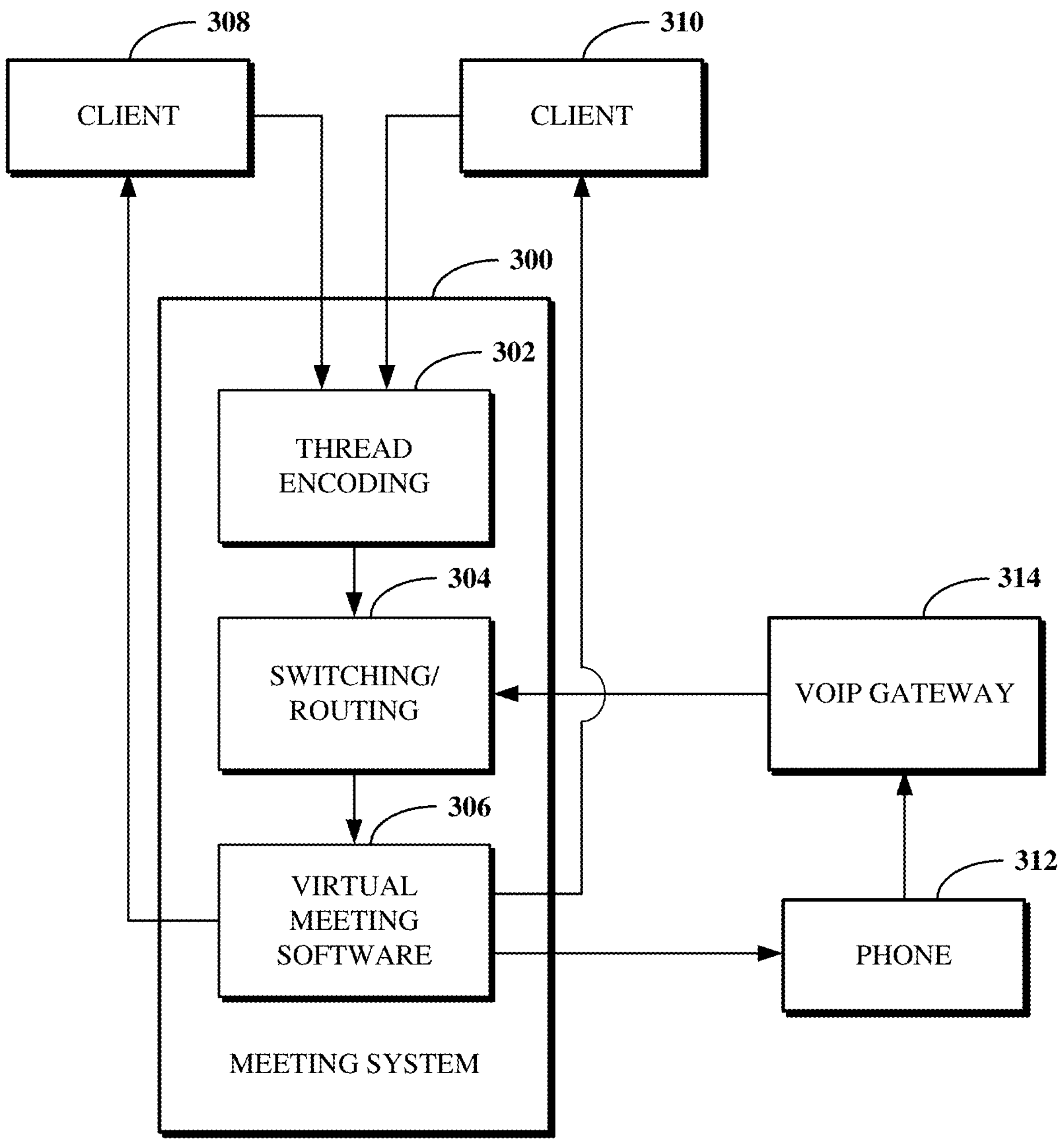
FIG. 3 is a block diagram of an example of a meeting system for delivering virtual meeting software services in an electronic computing and communications system.

FIG. 3 is a block diagram of an example of a meeting system 300 for delivering virtual meeting software services in an electronic computing and communications system, for example, the system 100 shown in FIG. 1. The meeting system 300 includes a thread encoding tool 302, a switching/routing tool 304, and virtual meeting software 306. The meeting system 300 enables use of the virtual meeting software 306 by clients and phones, such as clients 308 and 310 and phone 312. For example, one or both of the clients 308 or 310 may be a client 102 shown in FIG. 1. In another example, the phone 312 may be a phone 104 shown in FIG. 1. The meeting system 300 may in at least some cases be implemented using one or more servers of the system 100. Although two clients and a phone are shown in FIG. 3, other numbers of clients and/or other numbers of phones can connect to the meeting system 300.

A virtual meeting includes transmitting and receiving video, audio, and/or other data between clients and/or phones of virtual meeting participants. Each of the client 308, the client 310, and the phone 312 may connect through the meeting system 300 using separate input streams to enable users thereof to participate in a virtual meeting together using the virtual meeting software. The virtual meeting software 306 is software for implementing virtual meetings between users of two or more clients and/or phones. For example, the virtual meting software 306 can be the virtual meeting software described above with respect to the application server 108 of FIG. 1 or other virtual meeting software.

The virtual meeting software 306 includes a dedicated meeting view for each input stream received and processed at the meeting system 300. For example, a meeting view may be represented within a graphical user interface (GUI) of the virtual meeting software 306 by a dedicated box for a given participant. The content of the meeting view for a given participant may be dependent upon the source of the input stream for that participant. For example, where a participant accesses the virtual meeting software 306 from a client, such as the client 308 or 310, the meeting view for the participant may include a video output stream transmitted from the meeting system for viewing by all participants based on a video input stream received from the client, although the participant may optionally disable video features to suspend the video output stream from being presented in the meeting view. In another example, where a participant access the virtual meeting software 306 from a phone, such as the phone 312, the meeting view for the participant may be limited to a static image or other default background aspect since there is no video output stream produced for that participant.

The thread encoding tool 302 receives video input streams separately from the clients 308 and 310 and encodes those video input streams using one or more transcoding tools, such as to produce variant streams at different resolutions. The video input streams may be received over a network, for example, the network 114 shown in FIG. 1, or by a direct wired connection, such as using a universal serial bus (USB) connection or like coupling aspect. After the video input streams are encoded, the switching/routing tool 304 direct the encoded streams through applicable network infrastructure and/or other hardware to deliver the encoded streams to the virtual meeting software 306. The virtual meeting software 306 delivers output video streams representative of the respective encoded streams to each connected client, such as the clients 308 and 310, which receive and decode the output video streams to output them for display by video output components of the clients, such as within respective meeting views of the virtual meeting software 306.

A user of the phone 312 participates in the virtual meeting using an audio-only connection and may thus be referred to an audio-only caller. To participate in the virtual meeting from the phone 312, an audio signal from the phone 312 is received and processed at a VOIP gateway 314 to prepare a digital telephony signal for processing at the meeting system 300. The VOIP gateway 314 may be part of the system 100, for example, implemented at or in connection with a server of the datacenter 106. Alternatively, the VOIP gateway 314 may be located on the user-side, such as in a same location as the phone 312. The digital telephony signal is a packet switched signal transmitted to the switching/routing tool 304 for delivery to the virtual meeting software 306. The virtual meeting software 306 outputs an audio signal representing a combined audio capture for each participant of the virtual meeting for output by an audio output component of the phone 312. In some implementations, the VOIP gateway 314 may be omitted, for example, where the phone 312 is a VOIP-enabled phone.

A virtual meeting may be referred to as a video-enabled virtual meeting in which video streaming is enabled for one or more participants. The enabling of video streaming for a participant of a virtual meeting does not require that the participant activate or otherwise use video functionality for participating in the virtual meeting. For example, a virtual meeting may still be a video-enabled virtual meeting where none of the participants joining using clients turns on their video feed for any portion of the virtual meeting. In some cases, however, the virtual meeting may have video disabled, such as where each participant connects to the virtual meeting using a phone rather than a client, or where a host of the virtual meeting selectively configures the virtual meeting to exclude video functionality.

In some implementations, other software services may be accessible in connection with a virtual meeting implemented using the meeting system 300. For example, a virtual meeting may include or otherwise integrate functionality for instant messaging, unified messaging, and other types of messaging communications between participants of the virtual meeting, such as to facilitate a chat or like virtual conversation between users of those participants. Those other software services may be implemented at the meeting system 300 and/or a different aspect of the system 100.

Figure 4:
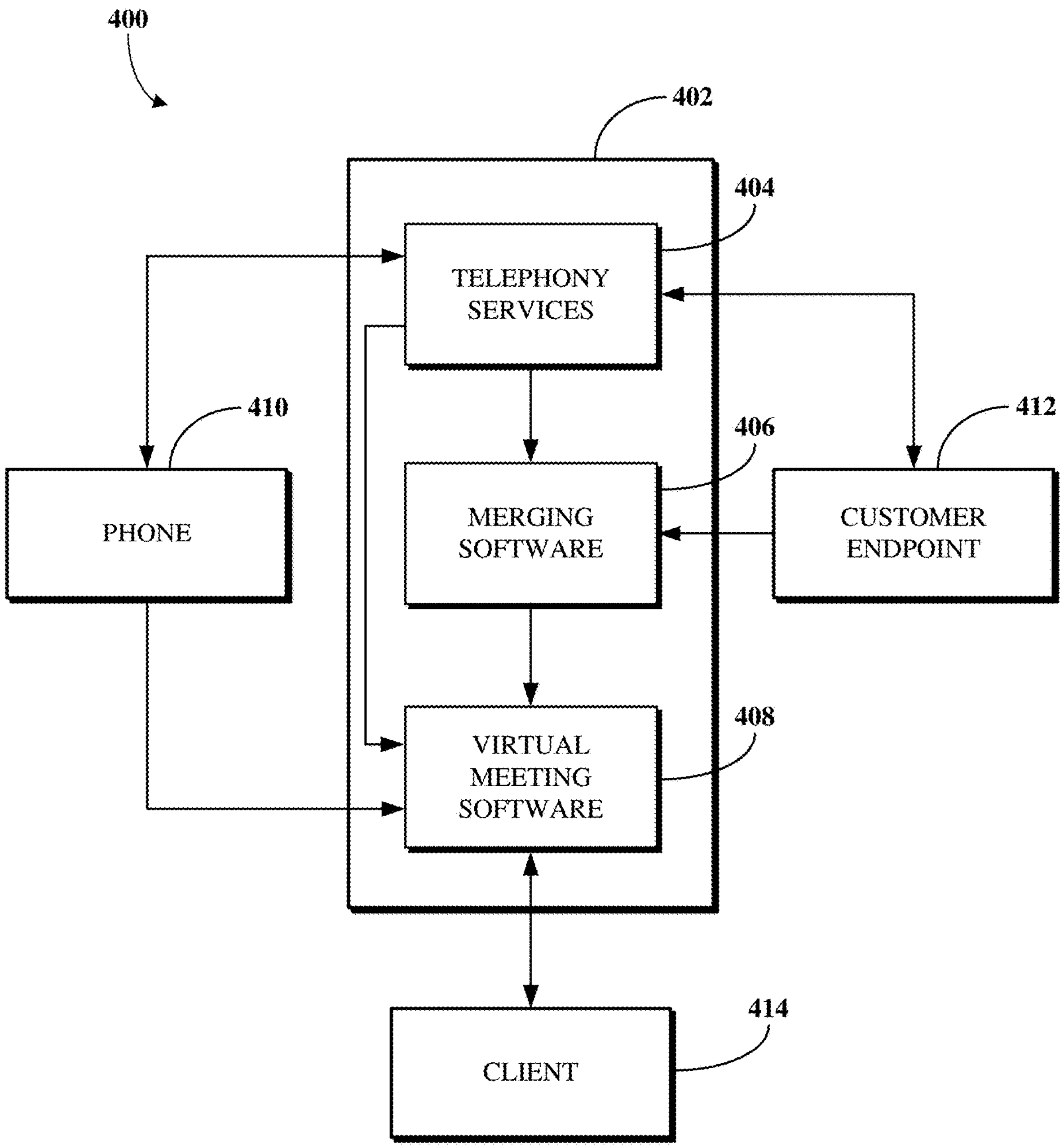
FIG. 4 is a block diagram of an example of a system for merging a call with a virtual meeting.

FIG. 4 is a block diagram of an example of a system 400 for merging a call with a virtual meeting. The system includes a server environment 402 which includes telephony services 404, merging software 406, and virtual meeting software 408. The server environment 402 may be implemented using one or more servers, for example, of a datacenter such as the datacenter 106 shown in FIG. 1. In particular, the telephony services 404, the switching software 406, and the virtual meeting software 408 may be implemented by different servers or by the same server, which may include one or more of the servers 108 through 112 shown in FIG. 1.

The telephony services 404 represent hardware, software, infrastructure, and/or other aspects used to operate a telephony connection, such as a call between two or more clients or phones, for example, between the phone device 410 and the customer endpoint 412. For example, the telephony services 404 may be implemented using the telephony server 112 shown in FIG. 1. In another example, the telephony services may be implemented using the thread encoding tool 310, the switching/routing tool 312, and/or the VOIP gateway 314 shown in FIG. 3, such as where those aspects are implemented other than as part of the telephony server 112. The operator of a client or phone connected to the call may or may not be a user of a software platform associated with the system 400 (e.g., a unified communications as a service (UCaaS) platform). An operator of a client or phone may, for example, be a human user, a software intelligence unit, or another entity.

The merging software 406 includes functionality for merging a call implemented using the telephony services 404 with a virtual meeting implemented using the virtual meeting software 408, which may, for example, be the virtual meeting software 314 shown in FIG. 3. For example, the operator of the phone device 410 may be attempting to reach an operator of a client 414 which is connected to the virtual meeting software 314. A call may be established between the phone device 410 and the customer endpoint 412, which may, for example, be a client or phone. For example, the operator of the client 414 may be participating a virtual meeting at the virtual meeting software 314 when the call is established. For example, the virtual meeting may be in-progress at the time the call is established between the phone device 410 and the customer endpoint 412. The virtual meeting may be deemed in-progress where the virtual meeting has already been initialized such that at least one participant is already connected to the virtual meeting. Thus, a virtual meeting may be in-progress regardless of whether any virtual meeting functionality has been used by any such participant.

An operator of the customer endpoint 412 may have access to meeting information associated with the operator of the client 414. For example, the operator of the customer endpoint 412 and the operator of the client 414 may both be users of the software platform associated with the system 400. The operator of the customer endpoint 412 may transmit a request for the phone device 410 to join the virtual meeting to the merging software 406. Based on that request, the merging software 406 can open a channel between the phone device 410 and a web service associated with the virtual meeting software 408. The phone device 410 may then join the virtual meeting at the virtual meeting software 408 over the opened channel to allow the operator of the phone device 410 (e.g., an audio-only caller) to participate in the virtual meeting with the operator of the client 414.

In one example, the operator of the customer endpoint 412 may be an assistant to the operator of the client 414. The operator of the client 414 may be an employee of a customer of a software platform associated with the system 400. The operator of the phone device 410, an audio-only caller, may be another employee of that customer, a person with whom the operator of the client 414 has scheduled a meeting, or a person who is not scheduled to be in a meeting with the operator of the client 414. The operator of the phone device 410 calls and speaks to the assistant operating the customer endpoint 412. The operator of the phone device 410 tells the assistant that he or she would like to speak with the operator of the client 414. The assistant, using his or her access to the meeting information associated with the operator of the client 414, can determine that the client 414 is in a virtual meeting. The assistant can then cause the merging software 406 to join the operator of the phone device 410 with the virtual meeting.

In another example, the operator of the customer endpoint 412 may be the same operator of the client 414. For example, the operator of the client 414 may operate both the client 414 and the customer endpoint 412 in which the client 414 is connected to the virtual meeting and the customer endpoint 412 is not. The operator of the phone device 410 can call the customer endpoint 412 to speak with the operator thereof. The operator of the customer endpoint 412 may then decide to merge the call with the operator of the phone device 410 into the virtual meeting to which the client 414 is connected, or the operator of the phone device 410 may ask the operator of the customer endpoint 412 to merge the call. In either case, for example, the operator of the customer endpoint 412 may access virtual meeting information and interact therewith to cause the merging software 406 to merge the call, thereby enabling the operator of the phone device 410 to become a participate to the virtual meeting.

In particular, the merging software 406 joins the operator of the phone device 410 with the virtual meeting without the operator of the phone device 410 having to exit the call or otherwise perform an action otherwise required to join a virtual meeting. For example, the virtual meeting software 408 may generally be configured to perform one or more security checks configured for a virtual meeting. A security check may include authenticating a prospective participant to the virtual meeting using one or more of a meeting identifier, a participant identifier, or other information usable to verify an identity of the prospective participant and/or to verify the subject virtual meeting. In another example, a prospective participant to a virtual meeting who is on a call may typically have to exit the call and either dial a new telephone number associated with the virtual meeting or open a client application to connect to the virtual meeting or otherwise navigate a web browser application to a web service for the virtual meeting. Thus, joining the operator of the phone device 410 with the virtual meeting includes bypassing one or more security checks configured for the virtual meeting.

Joining the operator of the phone device 410 with the virtual meeting further includes automatically and seamlessly connecting the operator of the phone device 410 from the call with the customer endpoint 412 to the virtual meeting. As such, after the operator of the phone device 410 in the first above example asks the assistant to connect him or her with the operator of the client 414 or after the operator of the phone device 410 in the second above example asks the operator of the client 414 to join the virtual meeting or is asked by that operator to do so, the operator of the phone device 410 experiences a seamless connection from that call with the customer endpoint 412 to that virtual meeting.

Where a client application associated with the virtual meeting software 408 is installed on the phone device 410, the merging software 406 may cause the client application to launch at the phone device in which the operator of the phone device 410 joins the virtual meeting as a full participant rather than as an audio-only caller. For example, the merging software 406 can transmit a push notification for the client application to the phone device 410 that, when interacted with at the phone device, 410 causes the client application to launch. Alternatively, where a client application associated with the virtual meeting software 408 is not installed on the phone device 410 opening the channel between the phone device 410 and the virtual meeting software 408 can include connecting the telephony services 414 and the virtual meeting software 408. For example, in such a case, the call can be maintained as an audio channel of the virtual meeting for the operator of the phone device 410.

The merging software 406 can determine whether the client application is installed on the phone device 410 by transmitting a request for response by the client application, such as a ping, to the phone device 410, and awaiting that response. Alternatively, the merging software 406 can determine whether the client application is installed on the phone device by searching records of the virtual meeting software 408 or of the software platform associated with the system 400 to determine whether an account associated with the phone device 410 is registered therewith. For example, the merging software 406 may perform phone number matching against the phone number of the phone device 410 to recognize the phone device 410 and determine whether the client application is installed thereon.

The request for the phone device 410 to join the virtual meeting is transmitted from the customer endpoint 412 based on an interaction with virtual meeting information at the customer endpoint 412. The virtual meeting information is associated with the operator of the client 414 and may, for example, be, include, or otherwise refer to event data associated with a calendar of the operator of the client 414 or the customer, meeting data included in a list of virtual meetings for the operator of the client 414 or the customer, or the like. The interaction with the virtual meeting information at the customer endpoint 412 may refer to the operator of the customer endpoint 412 toggling a user interface element of software at the customer endpoint 412 to gain access to a uniform resource locator (URL) of the virtual meeting (e.g., for connecting to a web service used therefor), a meeting identifier of the virtual meeting, or other information associated with the virtual meeting. For example, the software at the customer endpoint may be run locally at the customer endpoint or may be an instance of software run on a server device or another computing aspect.

In some implementations, the request for the phone device 410 may be based on an identification or selection of virtual meeting information using a software intelligence aspect at the customer endpoint 412 or otherwise in connection with software running at the customer endpoint 412. For example, a learning model or other software intelligence aspect may be trained to recognize certain virtual meeting information based on one or more criteria, for example, a list of participants who have been invited to a given virtual meeting. For example, the learning model or other software intelligence, responsive to the call from the phone device 410, can search through virtual meeting information based on information associated with the phone device 410 and/or the operator of the phone device 410. Such information may, for example, be obtained from the telephony services 404 (e.g., signaled within the call data itself), stored in a phone data database accessible to the merging software 406, or the like.

In some implementations, the customer endpoint 412 may be a client or phone which is not an endpoint of a customer of a software platform. For example, another client or phone functionally operating directly or indirectly as an intermediary between the phone device 410 and the merging software 406 may replace the customer endpoint 412.

In some implementations, the merging software 406 may be used to facilitate a virtual meeting between three or more participants, including one or more audio-only callers. For example, after the customer endpoint transmits the request to join multiple audio-only callers, the server implementing the merging software 406 bridges the telephony connections for each of the audio-only callers individually with a server implementing the telephony services 404. After the telephony connections are bridged, the join requests are transmitted to the phone devices of the audio-only callers. Bridging the telephony connections before transmitting the join requests enables the audio-only callers to connect to the virtual meeting without call disruption.

Figure 5:
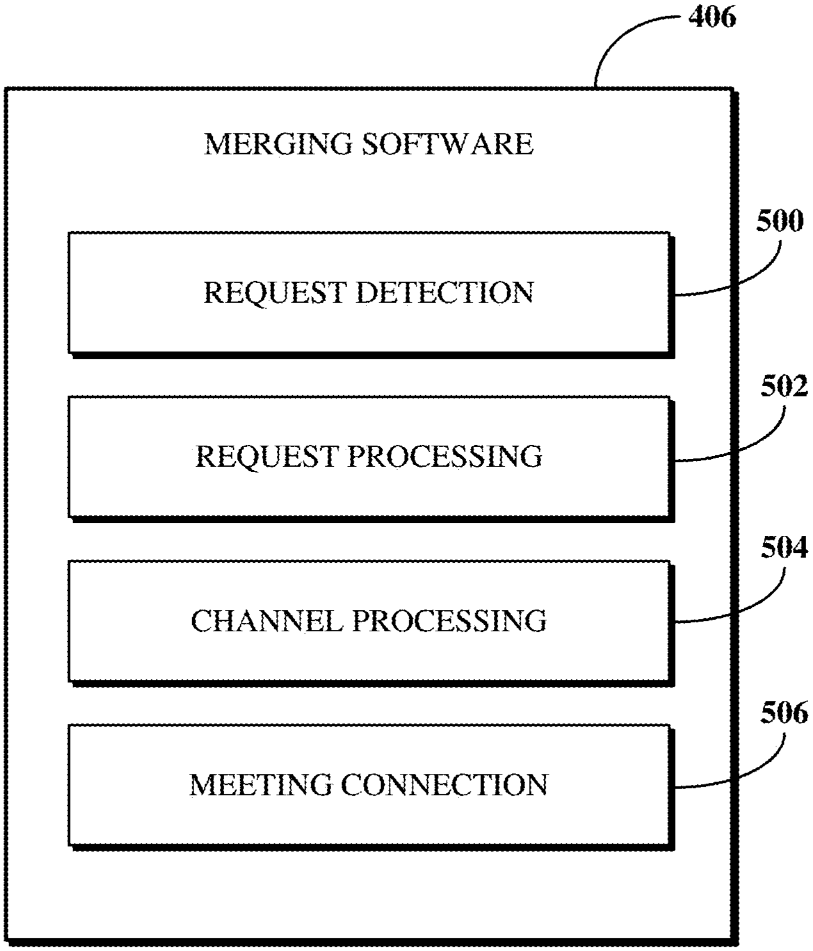
FIG. 5 is a block diagram of example functionality of merging software.

FIG. 5 is a block diagram of example functionality of the merging software 406 shown in FIG. 4. The merging software 406 includes tools for merging a call with a virtual meeting. As shown, the merging software 406 includes a request detection tool 500, a request processing tool 502, a channel processing tool 504, and a meeting connection tool 506. Although the tools 500 through 506 are shown as functionality of the merging software 400 as a single piece of software, in some implementations, some or all of the tools 500 through 506 may exist outside of the merging software 406.

The request detection tool 500 detects a request to join a phone device with a virtual meeting. The request may be from a participant of a call between the phone device and a customer endpoint. The request detection tool 500 may detect the request in one or more ways. For example, the detection may be based on a signal received from telephony services used to implement the call. In another example, the detection may be based on a signal received based on an interaction with software at the customer endpoint.

The request processing tool 502 processes the detected request to initiate a process for merging the call with the virtual meeting. In particular, the request processing tool 502 processes the request to identify the operator of the phone device to be joined to the virtual meeting, a meeting identifier or other aspect usable to identify the virtual meeting, and other information necessary to join the phone device with the virtual meeting.

The channel processing tool 504 opens a channel for connecting the phone device to the virtual meeting software service. The channel may be an audio-only channel or a video-enabled channel. The particular form of the channel may in at least some cases be based on whether a client application associated with the virtual meeting software service is installed on the phone device. If the client application is installed, the channel may be a channel for enabling audio and video streams to and from the virtual meeting software service. Otherwise, the channel may be an audio channel only.

The meeting connection tool 506 uses the channel opened by the channel processing tool 504 to join the phone device with the virtual meeting. The meeting connection tool 506 uses the channel to create a dedicated meeting view for the phone device. Where the channel opened with the phone device enables video stream communication, the dedicated meeting view may optionally display a video stream from the phone device. Alternatively, where the channel is audio-only, a static image may be output within the dedicated meeting view of the virtual meeting. The contents of the dedicated meeting view are viewable by meeting participants.

Figure 6:
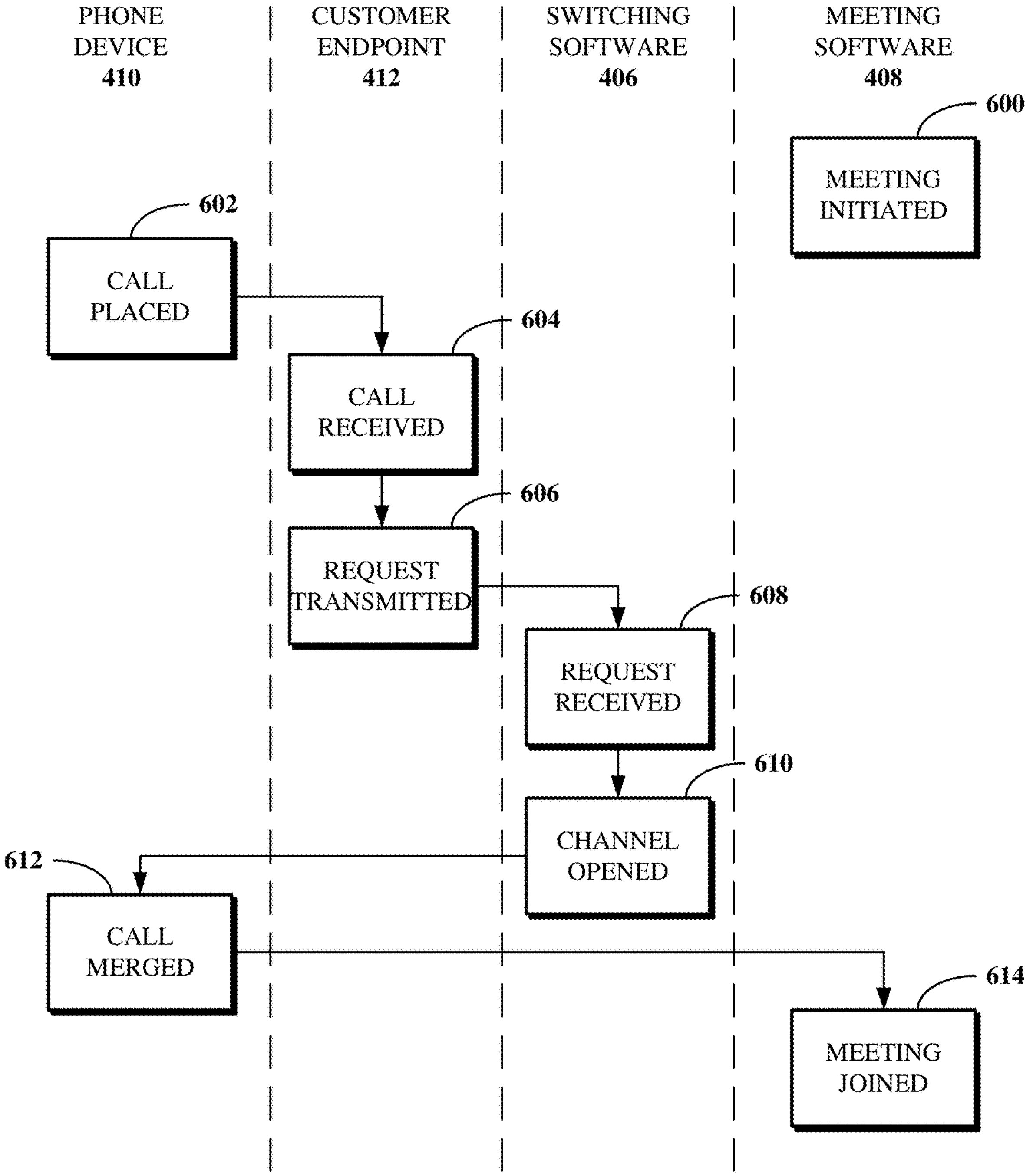
FIG. 6 is an illustration of swim lanes showing an example sequence of operations performed for merging a call with a virtual meeting.

FIG. 6 is an illustration of swim lanes showing an example sequence of operations performed for merging a call with a virtual meeting between a phone device, a customer endpoint, merging software, and virtual meeting software, for example, respectively the phone device 410, the customer endpoint 412, the merging software 406, and the virtual meeting software 408 shown in FIG. 4.

At 600, a virtual meeting is initiated at the virtual meeting software 408. At least one participant is connected to the virtual meeting. At 602, at a time after the virtual meeting is initiated, a call is placed from the phone device 410 to the customer endpoint 412. The call may be intended for the operator of the customer endpoint 412 or for an operator of another client or phone, for example, a participant of the virtual meeting. At 604, the customer endpoint 412 receives the call from the phone device 410, for example, connected over telephony services.

At 606, a request for the phone device 410 to join the virtual meeting is transmitted from the customer endpoint 412 to the merging software 406. At 608, the request is received by the merging software 406. At 610, the merging software 406 opens a channel between the phone device 410 and the virtual meeting software 408 based on the request. At 612, the call with the phone device 410 is merged into the virtual meeting. At 614, the phone device 410 joins the virtual meeting at the virtual meeting software 408.

In some implementations, the virtual meeting may be initiated at the virtual meeting software 408 in an order other than shown in FIG. 6. For example, the virtual meeting may be initiated after the request is received at 608.

Figure 7:
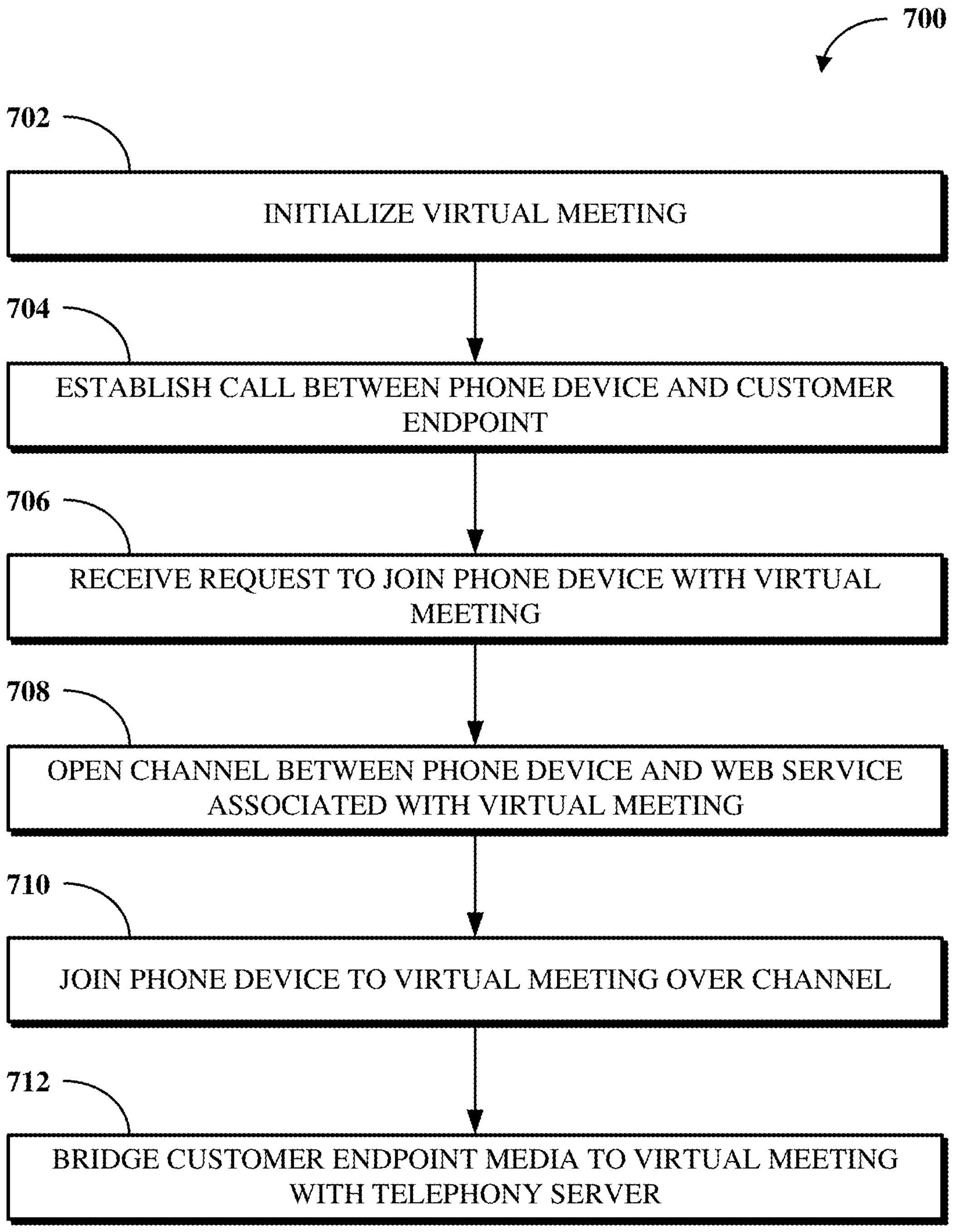
FIG. 7 is a flowchart of a first example of a technique for merging a call with a virtual meeting.
Figure 8:
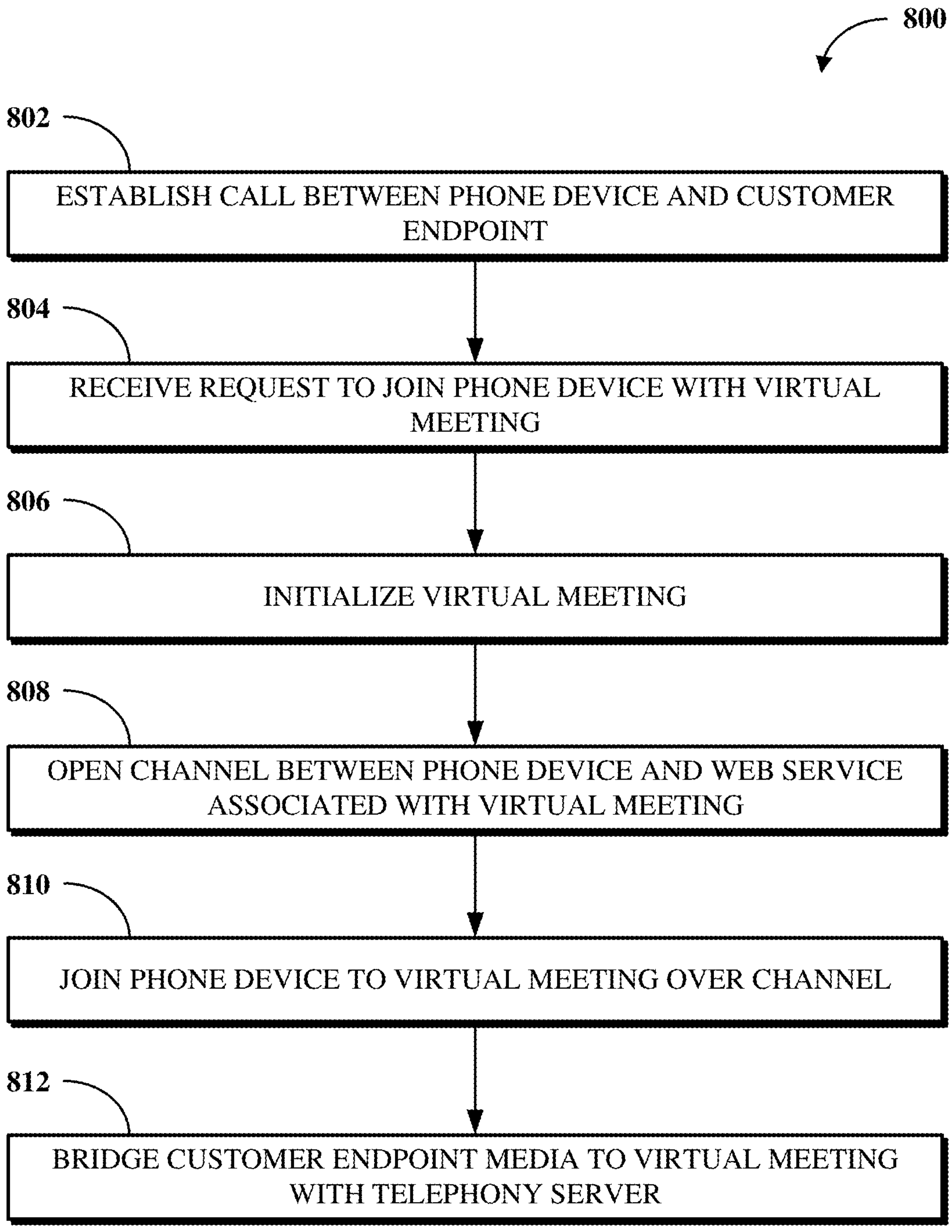
FIG. 8 is a flowchart of a second example of a technique for merging a call with a virtual meeting.

To further describe some implementations in greater detail, reference is next made to examples of techniques which may be performed to merge a call with a virtual meeting. FIG. 7 is a flowchart of a first example of a technique 700 for merging a call with a virtual meeting. FIG. 8 is a flowchart of a second example of a technique 800 for merging a call with a virtual meeting. The technique 700 and/or the technique 800 can be executed using computing devices, such as the systems, hardware, and software described with respect to FIGS. 1-6. The technique 700 and/or the technique 800 can be performed, for example, by executing a machine-readable program or other computer-executable instructions, such as routines, instructions, programs, or other code. The steps, or operations, of the technique 700 and/or the technique 800, or another technique, method, process, or algorithm described in connection with the implementations disclosed herein, can be implemented directly in hardware, firmware, software executed by hardware, circuitry, or a combination thereof.

For simplicity of explanation, the technique 700 and the technique 800 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 7, the technique 700 for merging a call with a virtual meeting is shown. At 702, a virtual meeting is initialized. At least one participant is connected to the virtual meeting, although there may be multiple participants connected to the virtual meeting when it is initialized or shortly thereafter. The virtual meeting is video-enabled such that a video streams of a participant connecting to the virtual meeting using a client can be presented in a dedicated meeting view within a GUI of the virtual meeting software implementing the virtual meeting. Participants connecting to the virtual meeting using a telephony connection (e.g., by calling into a service associated with the virtual meeting software) may have a dedicated meeting view with a static image.

At 704, a call is established between a phone device of an audio-only caller and a customer endpoint. The call is established over telephony services which route the call initiated at the phone device to the customer endpoint as a destination. Establishing the call includes creating or otherwise facilitating a telephony connection between the phone device and the customer endpoint, for example, over a VOIP telephone service or a standard PSTN.

In some implementations, the call may have been intended by the audio-only caller to be placed between the phone device of the audio-only caller and a client or phone of an operator associated with the virtual meeting. For example, the telephone number dialed by the audio-only caller may direct the audio-only caller to an assistant or other operator for the intended recipient, rather than the intended recipient himself or herself.

At 706, a request for the phone device to join the virtual meeting, which may be in-progress, is received from the customer endpoint. The request from the customer endpoint to join the phone device with the virtual meeting may be based on an interaction with the virtual meeting information at the customer endpoint. For example, where the virtual meeting is associated with a customer operator and the customer endpoint is a device of an assistant to the customer operator, the customer endpoint may run software having access to virtual meeting information of the customer operator. In this way, the assistant may access the virtual meeting information at the customer endpoint to transmit the request. Alternatively, the request from the customer endpoint to join the phone device with the virtual meeting may be based on output of a software intelligence aspect.

At 708, a channel is opened between the phone device and a web service associated with the virtual meeting. The channel connects the phone device to the virtual meeting service. As will be described below, the channel may be an audio-only channel or a video-enabled channel. In either case, the opening of the channel signals for the virtual meeting service to create a dedicated meeting view for the phone device.

At 710, the phone device is joined to the virtual meeting over the channel. The joining of the phone device to the virtual meeting allows the audio-only caller to become a participant to the virtual meeting. Joining the phone device to the virtual meeting over the channel includes bypassing one or more security checks configured for the virtual meeting. In one example, the one or more security checks that are bypassed include operations for authenticating participants of the in-progress virtual meeting. Thus, the audio-only caller may in at least some cases be allowed to join the virtual meeting without entering authentication credentials, for example, a meeting identifier, a participant identifier, and/or a password.

The audio channel used by the phone device for the virtual meeting may be provided over the channel opened between the phone device and the web service or may be provided by using the call between the phone device and the customer endpoint. For example, whether the channel opened between the phone device and the web service is used as the audio channel for the audio-only caller in the virtual meeting may depend upon whether a client application associated with the web service is installed on the phone device of the audio-only caller.

At 712, the customer endpoint media is bridged to the virtual meeting with a telephony server. For example, where the client application is installed on the phone device, the channel opened between the phone device and the web service is opened through the client application. In such a case, the phone device is joined to the virtual meeting using video and/or audio through that channel. However, where the client application is not installed on the phone device, the channel opened between the phone device and the web service may be used to receive audio of the call between the phone device and the customer endpoint in which the audio channel of the audio-only caller for the virtual meeting is the call itself. In some implementations, the customer endpoint may be disconnected from the call when the call is used as the audio channel of the audio-only caller for the virtual meeting.

In some implementations, connecting the phone device to the virtual meeting may expose the audio-only caller to one or more of a video channel, a screen share, a chat message, or a file transfer. For example, where the client application is installed on the phone device and is used to connect to the virtual meeting service, the channel between the phone device and the virtual meeting service may, via the client application, cause output at the phone device associated with various functionality of the virtual meeting service.

Referring next to FIG. 8, the technique 800 for merging a call with a virtual meeting is shown. At 802, a call is established between a phone device of an audio-only caller and a customer endpoint. The call is established over telephony services which route the call initiated at the phone device to the customer endpoint as a destination. Establishing the call includes creating or otherwise facilitating a telephony connection between the phone device and the customer endpoint, for example, over a VOIP telephone service or a standard PSTN.

In some implementations, the call may have been intended by the audio-only caller to be placed between the phone device of the audio-only caller and a client or phone of an operator other than the operator of the customer endpoint. For example, the telephone number dialed by the audio-only caller may direct the audio-only caller to an assistant or other operator for the intended recipient, rather than the intended recipient himself or herself.

At 804, a request for the phone device to join a virtual meeting is received from the customer endpoint. The request from the customer endpoint to join the phone device with the virtual meeting may be based on an interaction with virtual meeting information at the customer endpoint. For example, where the virtual meeting is associated with a customer operator and the customer endpoint is a device of an assistant to the customer operator, the customer endpoint may run software having access to virtual meeting information of the customer operator. In this way, the assistant may access the virtual meeting information at the customer endpoint to transmit the request. Alternatively, the request from the customer endpoint to join the phone device with the virtual meeting may be based on output of a software intelligence aspect.

At 806, a virtual meeting is initialized. At least one participant may be able to connect to the virtual meeting when it is initialized or shortly thereafter. The virtual meeting is video-enabled such that a video streams of a participant connecting to the virtual meeting using a client can be presented in a dedicated meeting view within a GUI of the virtual meeting software implementing the virtual meeting. Participants connecting to the virtual meeting using a telephony connection (e.g., by calling into a service associated with the virtual meeting software) may have a dedicated meeting view with a static image.

At 808, a channel is opened between the phone device and a web service associated with the virtual meeting. The channel connects the phone device to the virtual meeting service. As will be described below, the channel may be an audio-only channel or a video-enabled channel. In either case, the opening of the channel signals for the virtual meeting service to create a dedicated meeting view for the phone device.

At 810, the phone device is joined to the virtual meeting over the channel. The joining of the phone device to the virtual meeting allows the audio-only caller to become a participant to the virtual meeting. Joining the phone device to the virtual meeting over the channel includes bypassing one or more security checks configured for the virtual meeting. In one example, the one or more security checks that are bypassed include operations for authenticating participants of the in-progress virtual meeting. Thus, the audio-only caller may in at least some cases be allowed to join the virtual meeting without entering authentication credentials, for example, a meeting identifier, a participant identifier, and/or a password.

The audio channel used by the phone device for the virtual meeting may be provided over the channel opened between the phone device and the web service or may be provided by using the call between the phone device and the customer endpoint. For example, whether the channel opened between the phone device and the web service is used as the audio channel for the audio-only caller in the virtual meeting may depend upon whether a client application associated with the web service is installed on the phone device of the audio-only caller.

At 812, the customer endpoint media is bridged to the virtual meeting with a telephony server. For example, where the client application is installed on the phone device, the channel opened between the phone device and the web service is opened through the client application. In such a case, the phone device is joined to the virtual meeting using video and/or audio through that channel. However, where the client application is not installed on the phone device, the channel opened between the phone device and the web service may be used to receive audio of the call between the phone device and the customer endpoint in which the audio channel of the audio-only caller for the virtual meeting is the call itself. In some implementations, the customer endpoint may be disconnected from the call when the call is used as the audio channel of the audio-only caller for the virtual meeting.

In some implementations, connecting the phone device to the virtual meeting may expose the audio-only caller to one or more of a video channel, a screen share, a chat message, or a file transfer. For example, where the client application is installed on the phone device and is used to connect to the virtual meeting service, the channel between the phone device and the virtual meeting service may, via the client application, cause output at the phone device associated with various functionality of the virtual meeting service.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words “mechanism” and “component” are used broadly and are not limited to mechanical or physical implementations, but can include software routines in conjunction with processors, etc. Likewise, the terms “system” or “tool” as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

opening a channel between a device of an audio-only caller and a server facilitating an in-progress video-enabled virtual meeting, wherein the server comprises a virtual meeting service separate from a telephony service;

configuring a telephony connection between the device and a client device to use the channel to connect the device to the in-progress video-enabled virtual meeting, without one or more security checks, wherein audio from the telephony connection is routed to the virtual meeting service via the channel, and the client device is disconnected from the call telephony connection, in response to the device connecting to the in-progress video-enabled virtual meeting, without disconnecting the telephony connection; and creating a dedicated meeting view for the audio-only caller in the in-progress video-enabled virtual meeting.

2. The method of claim 1, comprising:

obtaining virtual meeting information associated with the in-progress video-enabled virtual meeting that corresponds to calendar information accessible by the client device via a calendar associated with a participant of the in-progress video-enabled virtual meeting.

3. The method of claim 1, wherein the one or more security checks that are bypassed include operations for authenticating participants of the in-progress video-enabled virtual meeting.

4. The method of claim 1, comprising:

based on a client application being installed on the device, causing the channel between the device and the server to open using the client application.

5. The method of claim 1, comprising:

determining that a client application is installed on the device; and transmitting, to the device, a push notification configured to cause the client application to launch.

6. The method of claim 1, wherein a user of the client device is an assistant to a participant of the in-progress video-enabled virtual meeting.

7. The method of claim 1, further comprising:

receiving a request from the client device to transfer the telephony connection to the in-progress video-enabled virtual meeting.

8. The method of claim 1, wherein the telephony connection is maintained as an audio channel of the in-progress video-enabled virtual meeting for the audio-only caller based on a client application not being installed on the device.

9. A system, comprising:

a server that facilitates a call established between a device of an audio-only caller and a client device and that facilitates an in-progress video-enabled virtual meeting, wherein the server comprises a virtual meeting service separate from a telephony service and the server runs software to:

open a channel between the device and the server;

configure a telephony connection between the device and the client device to use the channel to connect the device to the in-progress video-enabled virtual meeting, without one or more security checks, wherein audio from the telephony connection is routed to the virtual meeting service via the channel, and the client device is disconnected from the telephony connection in response to the device joining the in-progress video-enabled virtual meeting, without disconnecting the telephony connection; and create a dedicated meeting view for the audio-only caller in the in-progress video-enabled virtual meeting.

10. The system of claim 9, wherein the software is configured to:

obtain virtual meeting information associated with the in-progress video-enabled virtual meeting that corresponds to calendar information accessible by the client device via a calendar associated with a participant of the in-progress video-enabled virtual meeting.

11. The system of claim 9, wherein the one or more security checks that are bypassed include operations to authenticate participants of the in-progress video-enabled virtual meeting.

12. The system of claim 9, wherein the software is configured to:

based on a client application being installed on the device, cause the channel between the device and the server to open using the client application.

13. The system of claim 9, wherein the software is configured to:

receive a request from the client device to transfer the call to the in-progress video-enabled virtual meeting.

14. A server device, comprising:

a memory; and a processor configured to execute instructions stored in the memory to:

open a channel between a device of an audio-only caller and the server device that is facilitating an in-progress video-enabled virtual meeting, the server device includes a virtual meeting service separate from a telephony service;

configure merge a telephony connection between the device and a client device to use the channel to connect the device to the in-progress video-enabled virtual meeting, without one or more security checks, wherein audio from the telephony connection is routed to the virtual meeting service via the channel, and the client device is disconnected from the telephony connection in response to the device connecting to the in-progress video-enabled virtual meeting, without disconnecting the telephony connection; and create a dedicated meeting view for the device in the in-progress video-enabled virtual meeting.

15. The server device of claim 14, wherein the one or more security checks that are bypassed include operations for authenticating participants of the in-progress video-enabled virtual meeting.

16. The server device of claim 14, wherein a user of the client device is an assistant to a participant of the in-progress video-enabled virtual meeting, and wherein information of the in-progress video-enabled virtual meeting corresponds to calendar information accessible by the user of the client device via a calendar for the participant.

17. The server device of claim 14, wherein the processor is configured to execute the instructions to:

receive a request from the client device to transfer the telephony connection to the in-progress video-enabled virtual meeting.

18. The server device of claim 14, wherein the telephony connection is maintained as an audio channel of the in-progress video-enabled virtual meeting for the device based on a client application not being installed on the device.

19. The server device of claim 14, wherein the processor is configured to execute the instructions to:

based on a client application being installed on the device, cause the channel to open using the client application.

20. The server device of claim 14, wherein the processor is configured to execute the instructions to:

based on a client application being installed on the device, transmitting, to the device, a push notification configured to cause the client application to launch.

* * * * *